Jan. 15, 1924.　　　　　　　　　　　　　　　　　　　1,481,041
B. A. WALRATH
GEAR SHIFTING MECHANISM
Filed Dec. 30, 1921　　　　4 Sheets-Sheet 1
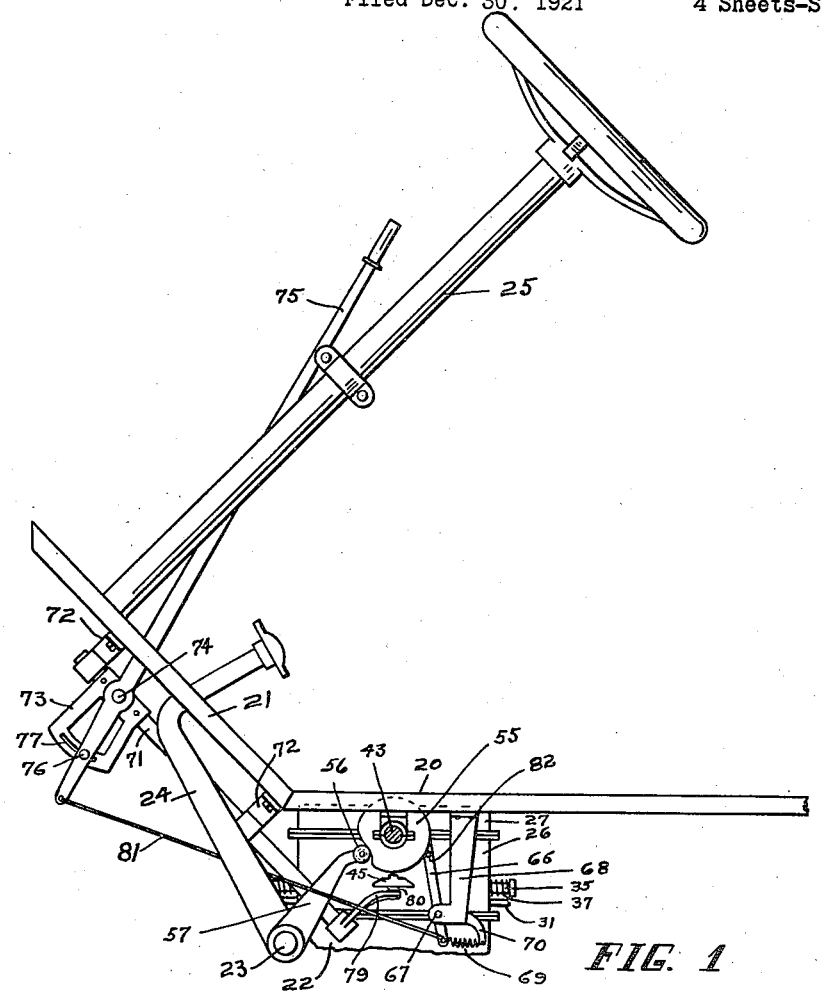
FIG. 1
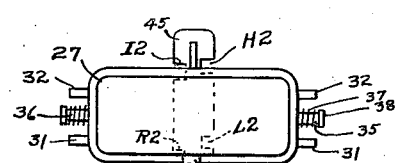
FIG. 2
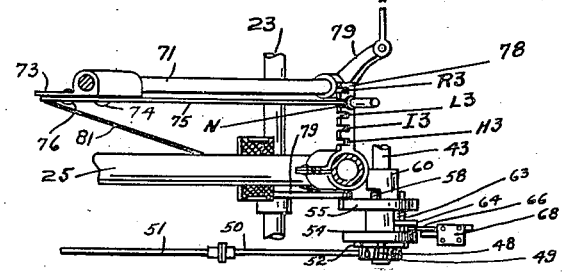
INVENTOR
B. A. WALRATH
BY
Milton S. Crandall
ATTORNEY Jan. 15, 1924. 1,481,041
B. A. WALRATH
GEAR SHIFTING MECHANISM
Filed Dec. 30, 1921  4 Sheets-Sheet 2
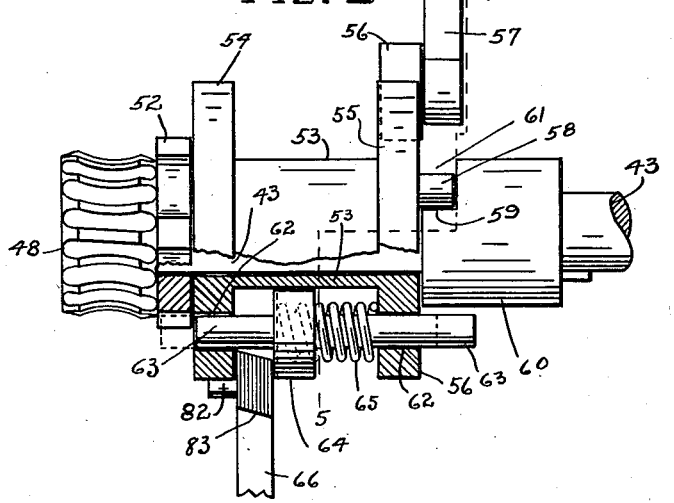
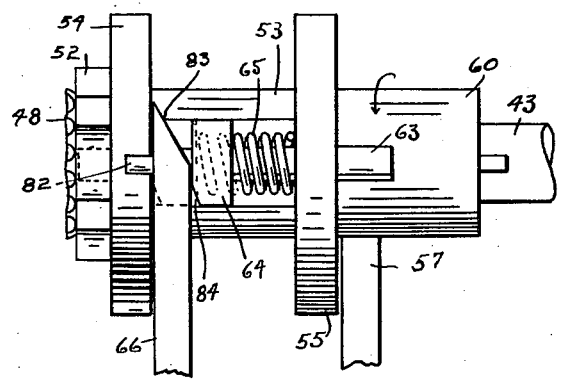
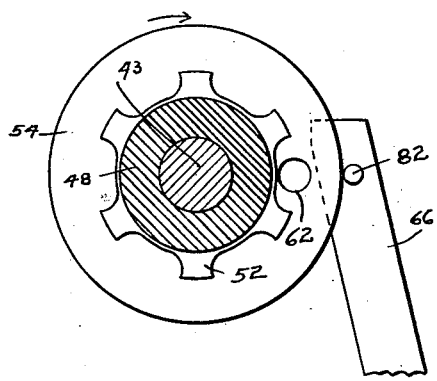
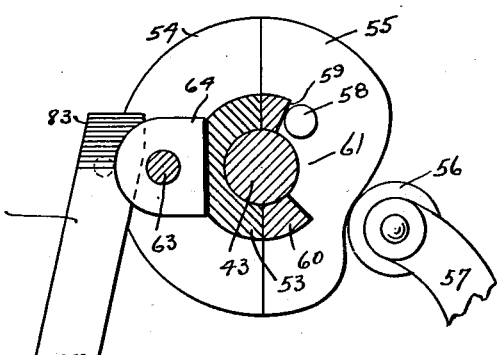
INVENTOR
*B. A. WALRATH*
BY
*Milton S. Crandall*
ATTORNEY

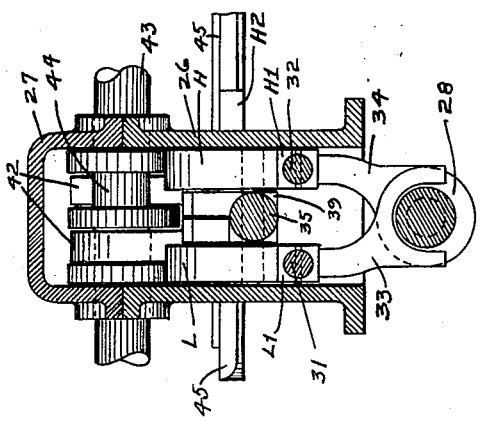

Jan. 15, 1924.
B. A. WALRATH
1,481,041
GEAR SHIFTING MECHANISM
Filed Dec. 30, 1921
4 Sheets-Sheet 4
FIG. 12
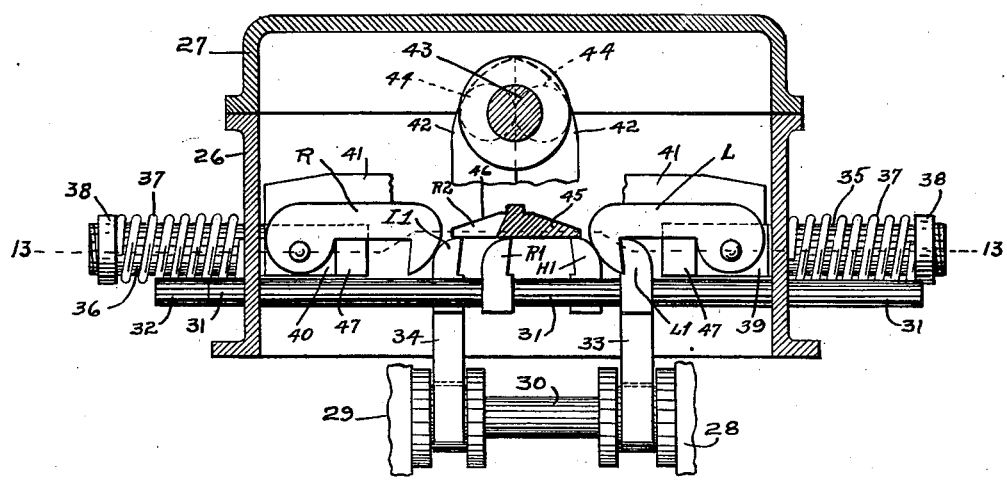
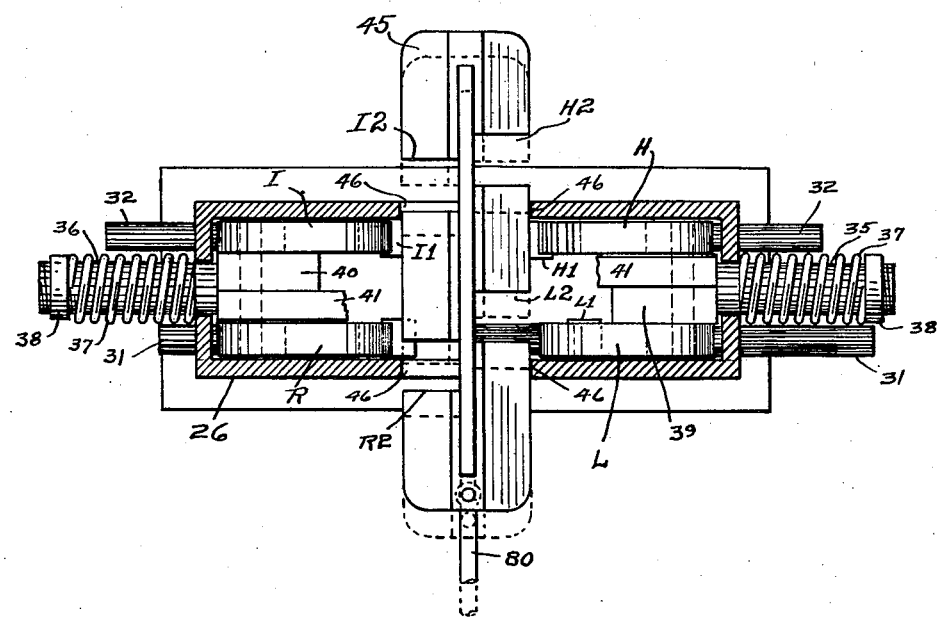
FIG. 13
INVENTOR.
B.A.WALRATH
BY *Milton D. Crandall*
ATTORNEYS.

Patented Jan. 15, 1924.

1,481,041

UNITED STATES PATENT OFFICE.

BURTON A. WALRATH, OF SIOUX CITY, IOWA.

GEAR-SHIFTING MECHANISM.

Application filed December 30, 1921. Serial No. 525,919.

*To all whom it may concern:*

Be it known that I, BURTON A. WALRATH, a citizen of the United States, and a resident of Sioux City, in the county of Woodbury and State of Iowa, have invented certain new and useful Improvements in Gear-Shifting Mechanisms, of which the following is a specification.

My invention aims, primarily, to provide an improved and simplified mechanism for the control of the shiftable elements of the power transmission of a motor vehicle.

Another object of the invention is the production of means for controlling the shiftable elements of the power transmission of a motor vehicle embodying certain novel characteristics and combinations for pre-selecting an element to be subsequently shifted, and improved means for shifting the elements between neutral and operative positions.

Furthermore, the invention contemplates an improved controlling means for the shiftable elements of the power transmission of a motor vehicle and automatically actuated by a driven member of the vehicle, or other suitable source of power.

Still further, the invention contemplates an improved gear shifting mechanism for the power transmission of motor vehicles which, although thoroughly dependable in operation, is simple and inexpensive in construction, embodies a minimum number of parts, is light in weight and readily installed.

These and many other objects and advantages I successfully attain in the embodiment hereinafter described, defined in the appended claims and illustraed in the accompanying drawings which form a part of this application and in which like characters of reference indicate corresponding parts throughout the several views, of which—

Fig. 1 is a side elevation of the preferred form of my invention as applied to a motor vehicle, the shifting mechanism actuating means being cut away and partly omitted.

Fig. 2 is a fragmentary plan of the same.

Fig. 3 is an enlarged plan, partially in section, of the shifting mechanism actuating means and associated parts.

Fig. 4 is a rear elevation of the same.

Fig. 5 is a transverse section thereof taken on the line 5—5 of Fig. 3.

Fig. 6 is a left end elevation of Fig. 4.

Fig. 7 is an enlarged plan of the shifting mechanism, the cover being removed and the parts shown in an operating position.

Fig. 8 is a longitudinal, vertical section of the same taken on the line 8—8 of Fig. 7.

Fig. 9 is a transverse, vertical section of the same taken on the line 9—9 of Fig. 8.

Fig. 10 is a plan of one of the gear controlling members.

Fig. 11 is a side elevation of the same.

Fig. 12 is a longitudinal, vertical section of the shifting mechanism taken on the line 8—8 of Fig. 7, the shifting arms being cut away and the parts being shown in normal and neutral position with a gear in an operative position; and Fig. 13 is a horizontal section of the same taken on the line 13—13 of Fig. 12.

Although I have illustrated but one embodiment of the invention, I would not be understood as being limited to such specific structure, for various alterations and modifications may be made in the details of construction and arrangement of parts herein disclosed without departing from the spirit and scope of the invention as defined in the appended claims.

On Sheet 1 of the drawings I have illustrated those conventional parts of a motor vehicle with which the present embodiment of my invention is particularly adapted to be associated. The usual floor boards, 20, and toe board, 21, are fixed vehicle parts suitable for the support of my selector mechanism and gear shifting mechanism actuating means, while the gear shifting mechanism may be supported by the usual power transmission case, 22. 23 represents the usual clutch-lever shaft and 24 the clutch pedal mounted thereon. 25 is the steering column.

The gear shifting mechanism embodies a suitable support, preferably comprising an oblong casing, 26, disposed longitudinally of the vehicle and adapted to be mounted upon and supplant the usual cover of the transmission case, 22. The shifting mechanism case, 26, is provided with a suitable cover, 27. My shifting mechanism is housed within the case, 26, to control the usual shiftable elements of the power transmission represented in Figs. 8, 9 and 12 by the fragmentary gears, 28 and 29, mounted to slide forwardly and rearwardly upon the shaft, 30, said gears being shown in their neutral or inoperative positions in Fig. 8, it being understood that forward and rearward movement of the element, 28, from its neutral position accordingly places it in reverse and low gear operative positions; and that similar movement of the gear, 29, places it in intermediate and high gear operative positions.

The said gears are controlled by separate forwardly and rearwardly movable members, preferably comprising sliding bars, 31 and 32, slidably supported by the end walls of the case, 26, the bar, 31, having a depending shifting fork, 33, operatively engaged with the gear, 28, and the bar, 32 having a similar fork, 34, for the control of the gear, 29.

Slidably projecting through the respective end walls of the case, 26, are plunger rods, 35 and 36, held yieldably extended from the said end walls as by compression springs, 37, interposed between the said walls and bosses, 38, on the ends of the said rods. The adjacent ends of the plungers, 35 and 36, are provided, respectively, with flat-sided heads, 39 and 40. On opposite sides of the head, 39, are pivoted dogs, L and H, the dog, L, being engageable with a lug, $L^1$, fixed on the bar, 31, and the dog, H, being engageable with a similar lug, $H^1$, on the bar, 32; and on the opposite sides of the head, 40, are pivoted dogs, R and I, the former being engageable with a lug, $R^1$, on the bar, 31, and the latter engageable with a similar lug, $I^1$, on the bar, 32. The heads, 39 and 40, carry raised horizontal arms, 41, positioned side by side, the free end portion of each arm being slidably supported by the opposite head; and provided with upright projecting parts, 42, normally so disposed that their adjacent edges meet the center transverse plane of the case, 26, as shown in Fig. 12. Extending transversely through the case, 26, and journaled in the side walls thereof, is a shaft, 43, carrying within the case oppositely disposed cams or cranks, 44, engaged, respectively, with the uprights, 42, positioned on opposite sides of the said shaft.

The parts of the mechanism above set forth are so constructed and related that when the shaft, 43, is given a half rotation the cams, 44, will coact with the parts, 42, to force the plungers, 35 and 36, toward each other, during which movement the dogs engage and are lifted by the lugs on the bars, 31 and 32, and are finally brought to position to drop into engagement with the adjacent faces of the lugs.

I provide means which, in its neutral position, holds the said dogs from engagement with the lugs therebelow; and which may be moved to any chosen one of four positions to accordingly permit any one of the desired dogs to engage the lug therebelow. In the embodiment illustrated, the said means consists of an elongated plate, 45, extending transversely through the case, 26, below the arms, 41, and slidably supported in openings, 46, in the side walls of the case. The side edges of the plate, 45, are beveled, and when the said plate is in its neutral position and the shaft, 43, is rotated, the dogs slide upon the beveled edges of the plate and are thereby held from dropping into engagement with the lugs therebelow. The sides of the said plate are provided with notches, $R^2$, $L^2$, $I^2$ and $H^2$, to admit the dogs. When the plate is in its neutral position, however, as shown in full lines in Fig. 13, none of the said notches is aligned with a dog, and to effect a gear change it is necessary to shift the plate to place the desired notch and dog in registration. For example, (referring to Fig. 13), to shift into reverse gear, the plate, 45, is so shifted as to place the notch, $R^2$, in alignment with dog, R. Then, it is clear that when the shaft, 43, is rotated the said dog will coact with the lug, $R^1$, to shift the gear, 28, as the compression springs, 37, retract the plungers, 35 and 36. Then, to shift the said gear to its low operative position the plate, 45, is shifted to the position shown in dotted lines in Fig. 13, placing the notch, $L^2$, in position to receive the dog, L. Then, with rotation of the shaft, 43, the dog, L, and lug, $L^1$, coact to slide the gear, 28, to the position shown in full lines in Fig. 12, and in similar fashion the intermediate and high gears are shifted, by so placing the plate, 45, that the notch, $I^2$, will receive dog, I, and the notch, $H^2$, will receive the dog, H. The plunger rod heads, 39 and 40, are provided with lateral projections, 47, aligned, respectively, with the lugs on the bars, 31 and 32, to coact with the lugs in shifting the gears from operative to neutral position. For example, with the plate, 45, in neutral position, a half revolution of the shaft, 43, forces the rods, 35 and 36 toward each other, causing the dog, L, to be lifted from the lug, $L^1$, permitting the lug to be engaged by and forced to neutral by the adjacent head projection, 47, but during such operation and subsequent to the shifting of the lug, $L^1$, to neutral, should another of said lugs be exposed, it will be engaged by its associated dog and forced to operative position when the plunger rods are retracted to their normal position by the compression springs, 37. In other words, the first half revolution of the shaft, 43, draws the plunger rods toward each other to neutralize any gear which may be in an operative position, and further rotation of the shaft, 43, permits the plunger rods to be retracted and shift to its operative position any pre-selected gear.

The gear shifting mechanism, above described, is actuated by means mounted on the extended end of the shaft, 43, and comprising a worm-wheel, 48 rotating freely on the shaft, 43, and driven by a worm, 49, on a shaft, 50, operatively connected with the pump-shaft or generator-shaft, 51, of the vehicle, by which arrangement, it is clear, the worm-wheel, 48, is driven constantly. Through the medium of a suitable clutch mechanism the worm-wheel, 48, actuates the shaft, 43, at the will of the driver, the clutch mechanism being controlled by the gear-selecting-mechanism, to be presently described. In the embodiment illustrated the said clutch mechanism comprises a star-wheel, 52, carried by the worm-wheel, 48, which, it will be understood rotates freely on the shaft, 43. On the shaft, 43, is freely mounted a sleeve, 53, carrying a second clutch-member, 54, adjacent the star-wheel, 52. The opposite end of the sleeve, 53, carries a cam, 55, engaged by an anti-friction roller, 56, carried by a lever, 57, mounted on the clutch-lever-shaft, 23. The cam, 55, is provided with a lateral stud, 58, engageable with a shoulder, 59, in the end of a collar, 60, fixed on the shaft, 43. The said shoulder, 59, is provided by a cut-out portion, 61, in the end of the collar, 60, which permits the shaft, 43, to run ahead of the cam during the last half of the revolution of the shaft, as will presently be made more clear.

The clutch-member, 54, and the cam, 55, are provided with aligned openings, 62, through which slides a bolt, 63, carrying a boss, 64, between which and the cam is interposed a compression spring, 65, to force the bolt into the path of the star-wheel, 52, as indicated in dotted lines in Figs. 3 and 4. The said bolt is held normally from the path of the star-wheel by the upper end portion of a lever, 66, fulcrumed as at 67 on a suitable bearing, 68, depending from the vehicle part, 20. A retracting spring, 69, between the lower end of the lever, 66, and a part, 70, on the lever-bearing serves to hold the said lever yieldably in and retract it to its normal position after disengagement from the clutch mechanism.

The clutch mechanism is controlled by the gear-selecting-mechanism, preferably comprising a rock-shaft, 71, journaled in suitable bearings, 72, below the vehicle part, 21. On the rock-shaft, 71, is fixed a quadrant, 73, on which is fulcrumed as at 74 a hand lever, 75, which extends upwardly at the side of the steering column to swing laterally, as well as forwardly and rearwardly. The lower end portion of the lever, 75, is slidably secured to the quadrant by means of a stud, 76, extending through an arcuate slot, 77, in the quadrant. In the rear of the lever, 75, the steering column carries a laterally-disposed selector-lever-guide-plate, 78, for the lever, the said plate being provided with equally-spaced notches to receive the lever, and identified as $R^3$, N, $L^3$, $I^3$ and $H^3$, which identifications, it will be understood, correspond to the respective gear positions. The lower end of the rock-shaft, 71, carries a crank-arm, 79, connected by a suitable link, 80, with the selector-guard-plate, 45. The lower end of the lever, 75, is connected by a link, 81, with the lower end of the clutch trip-lever, 66.

As shown in its neutral position in Fig. 2, the selector-lever, 75, is aligned with the notch, N, in the selector-lever-guide, 78, and by moving the selector-lever laterally to align it with any chosen one of the notches in the selector-guide the rock-shaft, 71, is thus turned, causing the crank-arm, 79, and link, 80, to coact to place the selector-guard-plate, 45, in a position to correspond with the position of the selector-lever with respect to its guide. For example, when the selector-lever is moved to the right into alignment with the notch, $R^3$, of the selector-lever-guide the selector-guard-plate, 45, will be so positioned that rotation of the shaft, 43, will place the reverse gear in operative position, and when the selector-lever is aligned with notches, $L^3$, $I^3$ or $H^3$, it will be understood that low, intermediate or high gear, has been accordingly selected. A gear having thus been selected, the gear-shifting-mechanism actuating-means is energized by drawing the lever rearwardly into the selected notch of the selector-lever-guide, which pulls the clutch-trip-lever, 66, rearwardly from the clutch mechanism, whereupon the compression spring, 65, places the clutch-members, 52 and 54, in co-operative relation, thus causing the shaft, 43, to make a single rotation, the first movement of which causes the cam, 55, to co-operate with the clutch-lever, 57, and clutch-lever-shaft, 23, to draw out the vehicle clutch and hold it out while the shaft, 43, completes its revolution to shift the pre-selected gear. In operating the selector-lever, 75, to energize the shifting-mechanism it is only necessary to pull it into the chosen notch and immediately release it, for it will be seen that upon disengagement of the lever, 66, from the clutch-part, 64, that the shaft, 43, immediately begins to rotate, and instantly with the release of the selector-lever, 75, the spring, 69, retracts the lever, 66, to its normal position, the said lever, 66, being preferably provided with a lateral stud, 82, which serves as a normal stop for the said lever and rests against the periphery of the clutch-member, 54, holding the upper end of the said lever, 66, in the path of the clutch part, 64, the upper end portion of the said lever, 66, being beveled to a point, as at 83, and the lower edge of the adjacent side of the part, 64, being beveled as at 84, which beveled part engages the beveled end of the lever, 66, as the clutch mechanism nears the end of its revolution, thus forcing the bolt, 63, from the star-wheel to stop the shaft, 43, in its normal position. By reference to Figs. 5 and 8 it will be clear that when the cams, 44, of the gear shifting mechanism have passed the dead center of their first half revolution that the cut-out portion, 61, in the collar, 60, of the actuating-mechanism permits the compression springs, 37, to cause the shifting parts, 42, to act on the cams, 44, to complete the revolution of the shaft, 43, ahead of the actuating-mechanism cam, 55, whereby the shifted gears are thrown quickly into registration without clashing and prior to release of the vehicle clutch lever, 57.

Furthermore, it will be observed that the shifting - mechanism positively locks the gears, whereby their accidental movement from operative position is prevented.

Having thus described my invention what I claim as new and desire to secure by Letters Patent of the United States, is,—

1. The combination with a motor-vehicle including its main clutch-controlling shaft, and shiftable power-transmission elements, of shifting mechanism for said elements, and means for actuating the shifting mechanism and controlling the main clutch comprising a single rotating shaft to actuate the shifting mechanism, a driven clutch member mounted coaxially with the said rotating shaft, a second clutch member fixed on the said rotating shaft, yieldable means tending to force said clutch members into co-operative relation, releasable means holding said clutch members, normally disengaged, an operating crank arm on the clutch-controlling shaft, and a cam fixed on the said rotating shaft directly coacting with the crank-arm to operate the clutch-controlling shaft.

2. The combination with a motor-vehicle having a variable speed power transmission including a plurality of gears shiftable between neutral and operative positions, of selective shifting-mechanism for the control of the gears, including engageable shifting members for the respective gears, reciprocating elements movable in one direction to coact with said members to shift the gears to neutral, and engageable with said members when retracted to shift the gears to operative positions, means for reciprocating said elements, and a selector-guard member to normally prevent engagement of said elements with said members, and movable to different positions to permit engagement of any chosen one of said elements with the associated one of said members.

3. The combination with a motor-vehicle having a variable speed power-transmission including a plurality of gears shiftable between neutral and operative positions, of selective shifting-mechanism for the control of the gears, including engageable shifting members for the respective gears, reciprocating elements movable in one direction to coact with said members to shift the gears to neutral, and engageable with said members when retracted to shift the gears to operative positions, means for reciprocating said elements including projecting parts on said elements, a cam-shaft coacting with said parts to move the elements in one direction, and yieldable means for retracting said elements, and a selector-guard member to normally prevent engagement of said elements with said members, and movable to different positions to permit engagement of any chosen one of said elements with the associated one of said members.

4. The combination with a motor-vehicle having a power-transmission including a plurality of gears, shiftable between neutral and operative positions, of selective shifting mechanism for the control of the gears, including engageable shifting members for the gears, oppositely reciprocating elements movable toward each other to coact with said members when retracted to shift the gears to operative positions, means for reciprocating said elements, and a selector guard member to normally prevent engagement of said elements with said members, and movable to different positions to permit engagement of a chosen one of said elements with the associated one of said members.

5. The combination with a motor-vehicle having a power-transmission including a plurality of gears, shiftable between neutral and operative positions, of selective shifting mechanism for the control of the gears, including engageable shifting members for the gears, oppositely reciprocating elements movable toward each other to coact with said members when retracted to shift the gears to operative positions, means for reciprocating said elements including projecting parts on said elements, a cam-shaft, coacting with said parts to move the elements in one direction, and yieldable means for retracting said elements, and a selector guard member to normally prevent engagement of said elements with said members, and movable to different positions to permit engagement of a chosen one of said elements with the associated one of said members.

6. A gear shift embodying two parallel bars each shiftable longitudinally to and between neutral and operative positions on opposite sides of neutral, two plungers parallel with the bars and movable toward and from each other, dogs pivoted on the plungers to respectively engage and shift the bars, a selector-strip to hold said dogs from engagement with the bars, movable transversely of the bars and having lateral notches to admit the dogs into engagement with the bars, said notches being so positioned that by appropriate movement of the selector strip any chosen dog may be engaged with the associated bar and the other dogs held from engagement with their associated bars, and means for actuating the plungers.

7. A gear shift embodying two parallel bars each shiftable longitudinally to and between neutral and operative positions on opposite sides of neutral, two plungers parallel with the bars and movable toward and from each other, dogs pivoted on the plungers to respectively engage and shift the bars, a selector-strip to hold said dogs from engagement with the bars, movable transversely of the bars and having lateral notches to admit the dogs into engagement with the bars, said notches being so positioned that by appropriate movement of the selector strip any chosen dog may be engaged with the associated bar and the other dogs held from engagement with their associated bars, and means for actuating the plungers including lateral arms on the plungers, cams coacting with the arms to move the plungers in one direction, and yieldable means for retracting the plungers.

8. A gear shift embodying two parallel bars each shiftable longitudinally to and between neutral and operative positions on opposite sides of neutral, two plungers parallel with the bars and movable toward and from each other, dogs pivoted on the plungers to respectively engage and shift the bars, a selector-strip to hold said dogs from engagement with the bars, movab'e transversely of the bars and having lateral notches to admit the dogs into engagement with the bars, said notches being so positioned that by appropriate movement of the selector strip any chosen dog may be engaged with the associated bar and the other dogs held from engagement with their associated bars, and means for actuating the plungers including lateral arms on the plungers, springs holding the plungers normally extended from each other, and cams coacting with said arms to move the plungers toward each other.

In testimony whereof I have hereunto set my hand this 27th day of December, 1921.

BURTON A. WALRATH.